United States Patent
Davis et al.

(10) Patent No.: US 9,500,133 B2
(45) Date of Patent: Nov. 22, 2016

(54) MOUNT WITH AN AXIAL UPSTREAM LINKAGE FOR CONNECTING A GEARBOX TO A TURBINE ENGINE CASE

(71) Applicant: United Technologies Corporation, Hartford, CT (US)

(72) Inventors: Todd A. Davis, Tolland, CT (US); Timothy Webb, East Hampton, CT (US); Mark Ronski, Tolland, CT (US); David A. Stachowiak, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 786 days.

(21) Appl. No.: 13/726,131

(22) Filed: Dec. 23, 2012

(65) Prior Publication Data
US 2014/0174252 A1 Jun. 26, 2014

(51) Int. Cl.
*F02C 7/32* (2006.01)
*F01D 25/28* (2006.01)

(52) U.S. Cl.
CPC .............. *F02C 7/32* (2013.01); *F01D 25/28* (2013.01); *F05D 2240/91* (2013.01); *F05D 2260/311* (2013.01); *Y02T 50/671* (2013.01); *Y10T 74/2186* (2015.01)

(58) Field of Classification Search
CPC .......... F02C 7/32; F02C 7/36; F01D 21/045; F01D 25/28; F05D 2240/91; F05D 2260/311; B64D 2027/266
See application file for complete search history.

(56) References Cited

U.S. PATENT DOCUMENTS

| | | | |
|---|---|---|---|
| 5,435,124 A | 7/1995 | Sadil et al. | |
| 6,170,252 B1 | 1/2001 | Van Duyn | |
| 6,212,974 B1 | 4/2001 | Van Duyn | |
| 6,260,351 B1 | 7/2001 | Delano et al. | |
| 6,357,220 B1 | 3/2002 | Snyder et al. | |
| 7,055,330 B2 | 6/2006 | Miller | |
| 7,500,465 B2 | 3/2009 | Pfaeffle et al. | |
| 7,975,465 B2 | 7/2011 | Morris et al. | |
| 8,011,883 B2 | 9/2011 | Schwarz et al. | |
| 8,100,638 B2 * | 1/2012 | Udall | F01D 21/08 415/133 |
| 8,176,725 B2 | 5/2012 | Norris et al. | |
| 8,192,143 B2 | 6/2012 | Suciu et al. | |
| 8,210,800 B2 | 7/2012 | Suciu et al. | |
| 8,256,576 B2 | 9/2012 | Glahn et al. | |
| 8,333,554 B2 * | 12/2012 | Chaudhry | F02C 7/32 415/122.1 |
| 2004/0216461 A1 | 11/2004 | Wallace et al. | |
| 2005/0241292 A1 | 11/2005 | Taylor et al. | |

(Continued)

FOREIGN PATENT DOCUMENTS

| | | |
|---|---|---|
| JP | 2003286866 | 10/2003 |
| WO | 2014137575 | 9/2014 |

OTHER PUBLICATIONS

International search report for PCT/US2013/0077525 dated Apr. 22, 2014.
International search report for PCT/US2013/0077506 dated Oct. 8, 2014.

(Continued)

*Primary Examiner* — Arun Goyal
(74) *Attorney, Agent, or Firm* — O'Shea Getz P.C.

(57) ABSTRACT

A turbine engine assembly includes a turbine engine case, a gearbox and a plurality of gearbox mounts that connect the gearbox to the case. The case extends along an axis between an upstream end and a downstream end. The gearbox mounts include an axial mount that extends axially in an upstream direction from the gearbox to the case.

18 Claims, 7 Drawing Sheets

(56) References Cited

U.S. PATENT DOCUMENTS

| | | |
|---|---|---|
| 2006/0075754 A1 | 4/2006 | Champion et al. |
| 2007/0084183 A1 | 4/2007 | Moniz et al. |
| 2008/0098716 A1 | 5/2008 | Orlando et al. |
| 2011/0239660 A1 | 10/2011 | Suciu et al. |
| 2011/0296847 A1 | 12/2011 | Williams |
| 2013/0160459 A1* | 6/2013 | Thies ............... F02C 7/32 60/796 |

OTHER PUBLICATIONS

EP search report for EP13877699.2 dated Nov. 26, 2015.

* cited by examiner

MOUNT WITH AN AXIAL UPSTREAM LINKAGE FOR CONNECTING A GEARBOX TO A TURBINE ENGINE CASE

BACKGROUND OF THE INVENTION

1. Technical Field

This disclosure relates generally to a turbine engine and, more particularly, to mounts for connecting a gearbox to a turbine engine case.

2. Background Information

A turbine engine may include an accessory gearbox for driving one or more engine accessories. Examples of an engine accessory include a fuel pump, a scavenge pump, an electrical generator, an external deoiler and a hydraulic pump. The gearbox may also be connected to a starter, and drive a compressor section of the engine during start up. The gearbox is typically connected to a turbine engine case with three gearbox mounts, where the case houses a core of the engine. A pair of radial mounts, for example, may extend radially inward from the gearbox to a first segment of the case, which houses the compressor section of the core. An axial mount may extend axially from the gearbox to a downstream second segment of the case, which is downstream of the first segment and houses a combustor section of the core.

Each of the gearbox mounts may include a fuse joint for reducing transmission of shock loads between the case and the gearbox. Such a fuse joint may prevent movement between the gearbox and the case during nominal flight conditions. However, the fuse joint may permit movement between the gearbox and the case during non-nominal flight conditions where the engine is subject to a shock load; e.g., where the engine is subject to heavy turbulence or a hard landing, the engine ingests a foreign object such as a bird, a rotor blade becomes unseated, etc. The radial mounts may each include a first type of fuse joint, and the axial mount may include a second type of fuse joint, or combination thereof.

The second segment of the case may be subject to the relatively high temperatures within the combustor section, which may cause this segment to thermally expand during engine operation. Such thermal expansion may subject the gearbox mounts and the gearbox to relatively high internal stresses. The expansion of the case, for example, may pull ends of the mounts that are connected to the case away from one another. The gearbox mounts and the gearbox therefore typically require greater safety margins and higher tolerances in order to withstand the additional internal stresses induced by the thermal expansion of the case. Such gearbox mount and gearbox over-engineering, however, may increase the complexity, cost and weight of the engine.

There is a need in the art for improved mounts for connecting a gearbox to a turbine engine case.

SUMMARY OF THE DISCLOSURE

According to an aspect of the invention, a turbine engine assembly is provided that includes a turbine engine case, a gearbox and a plurality of gearbox mounts that connect the gearbox to the case. The case extends along an axis between an upstream end and a downstream end. The gearbox mounts include an axial mount that extends axially in an upstream direction from the gearbox to the case.

According to another aspect of the invention, another turbine engine assembly is provided that includes a turbine engine case, a gearbox and a plurality of gearbox mounts that connect the gearbox to the case. The case extends along an axis between an upstream end and a downstream end. The gearbox mounts include a strut that extends axially between an upstream portion connected to the case and a downstream portion connected to the gearbox.

According to another aspect of the invention, a turbine engine assembly is provided that includes a gearbox and a plurality of gearbox mounts. The gearbox includes a gearbox case that extends between a downstream end and an upstream end. The gearbox also includes a power input that extends along an axis, and is located at the upstream end. The gearbox mounts are connected to the gearbox case. The gearbox mounts include an axial mount that extends axially in an upstream direction from the gearbox case.

The axial mount may include a first linkage, a second linkage and a fuse joint. The fuse joint may be configured to substantially prevent movement between the first linkage and the second linkage when the fuse joint is subject to loading less than a threshold. The fuse joint may also be configured to permit a constrained movement between the first linkage and the second linkage when the loading is greater than the threshold.

The axial mount may have a radial height and an axial length that is greater than the radial height.

A pair of flanges may be connected to the case. The axial mount may include a linkage that extends axially between a downstream end portion and an upstream end portion. The upstream end portion may be arranged between and connected to the flanges. The upstream end portion may include a bearing that is connected to the flanges.

The case may include a plurality of discrete axial segments including a first segment and a second segment that is downstream of the first segment. The axial mount may connect the gearbox to the first segment. A second of the gearbox mounts may connect the gearbox to the second segment. The axial segments may also include a third segment arranged axially between the first and the second segments. A third of the gearbox mounts may connect the gearbox to the third segment. The first segment may house at least a portion of the compressor section. The second segment may house at least a portion of the combustor section.

The gearbox mounts may include a second axial mount that extends axially in an upstream direction from the gearbox to the case. The gearbox mounts may also or alternatively include a radial mount that extends in a direction substantially perpendicular to the axis from the gearbox to the case.

The axial mount may include a linkage and a fuse joint that connects the linkage to the case. The fuse joint may be configured to substantially prevent movement between the linkage and the case when the fuse joint is subject to loading less than a threshold. The fuse joint may be configured to permit constrained movement between the linkage and the case when the loading is greater than the threshold.

The linkage may include a plurality of apertures. The fuse joint may include a plurality of fasteners that connect the linkage to the case and that respectively extend into the apertures.

The linkage may include an aperture. The fuse joint may include a sleeve that extends into the aperture, and a fastener that extends into the sleeve. The sleeve and the fastener may connect the linkage to the case.

A bracket may be connected to the case, and include a first aperture and a second aperture. The axial mount may include a linkage, a first fastener and a second fastener. The linkage may include a third aperture and a fourth aperture. The first fastener may extend into the first and the third apertures, and have a diameter that is substantially equal to respective diameters of the first and the third apertures. The second fastener may extend into the second and the fourth apertures, and have a diameter that is less than at least one of a diameter of the second aperture and a diameter of the fourth aperture.

The axial mount may include a linkage, a sleeve and a fastener. The sleeve may extend into an aperture of the linkage. The fastener may extend into the sleeve, and be separated from the sleeve by a gap.

The case may include a plurality of discrete axial segments including a first segment that houses at least a portion of the compressor section and a second segment that houses at least a portion of the combustor section The axial mount may include a base and a plurality of arms. The base may be connected to the case. The arms may be connected to the gearbox, and may converge to the base.

The foregoing features and elements may be combined in various combinations without exclusivity, unless expressly indicated otherwise. These features and elements as well as the operation of the invention will become more apparent in light of the following description and the accompanying drawings.

DETAILED DESCRIPTION OF THE INVENTION

Figure 1:
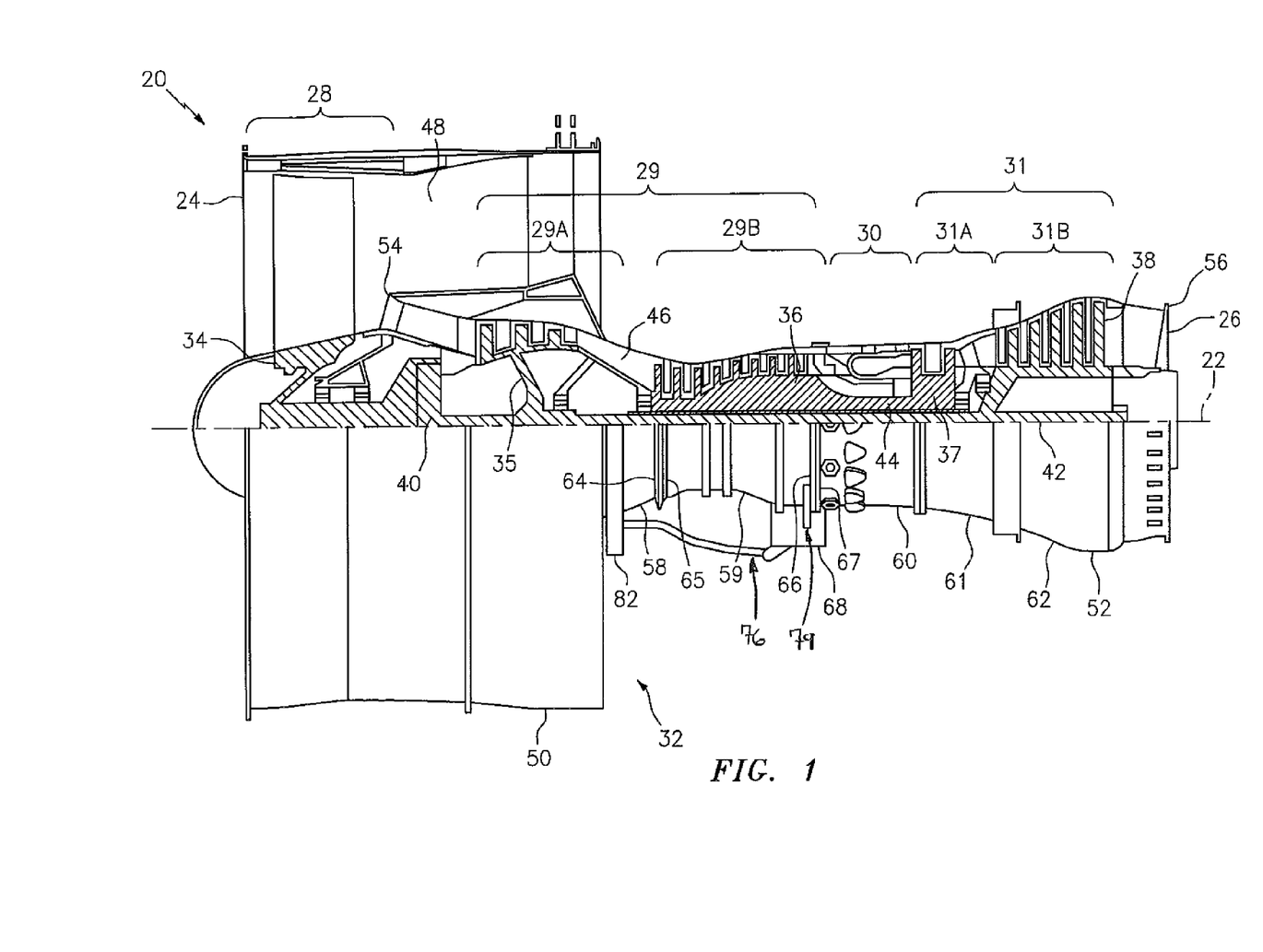
FIG. 1 is a side cutaway illustration of a geared turbine engine.

FIG. 1 is a side cutaway illustration of a geared turbine engine 20 that extends along an axis 22 between a forward upstream airflow inlet 24 and an aft downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28, 29A, 29B, 30, 31A and 31B are arranged sequentially along the axis 22 within an engine housing 32, which is described below in further detail.

Each of the engine sections 28, 29A, 29B, 31A and 31B includes a respective rotor 34-38. Each of the rotors 34-38 includes a plurality of rotor blades arranged circumferentially around and connected (e.g., mechanically fastened, welded, brazed or otherwise adhered) to one or more respective rotor disks. The fan rotor 34 is connected to a gear train 40. The gear train 40 and the LPC rotor 35 are connected to and driven by the LPT rotor 38 through a low speed shaft 42. The HPC rotor 36 is connected to and driven by the HPT rotor 37 through a high speed shaft 44. The low and high speed shafts 42 and 44 are rotatably supported by a plurality of bearings. Each of the bearings is connected to the engine housing 32 by at least one stator such as, for example, an annular support strut.

Air enters the engine 20 through the airflow inlet 24, and is directed through the fan section 28 and into an annular core gas path 46 and an annular bypass gas path 48. The air within the core gas path 46 may be referred to as "core air". The air within the bypass gas path 48 may be referred to as "bypass air" or "cooling air". The core air is directed through the engine sections 29-31 and exits the engine 20 through the airflow exhaust 26. Within the combustion section 30, fuel is injected into and mixed with the core air and ignited to provide forward engine thrust. The bypass air is directed through the bypass gas path 48 and out of the engine 20 to provide additional forward engine thrust or reverse thrust via a thrust reverser. The bypass air may also be utilized to cool various turbine engine components within one or more of the engine sections 29-31.

Referring still to FIG. 1, the engine housing 32 includes an annular outer turbine engine case 50 and an annular inner turbine engine case 52, which define the gas paths 46 and 48. The case 50 forms a fan nacelle that houses the fan section 28. The case 52 forms a core nacelle that extends axially between an upstream end 54 and a downstream end 56. The case 52 includes one or more discrete axial segments 58-62, which are arranged sequentially along the axis 22. These segments 58-62 may be respectively connected together by bolted flanges; e.g., the flange 64 is bolted to the flange 65 and the flange 66 is bolted to the flange 67. The segments 58 and 59 each house respective portions of the compressor section 29. The segment 60 houses at least a portion of the combustor section 30. The segments 61 and 62 house respective portions of the turbine section 31.

Figure 2:
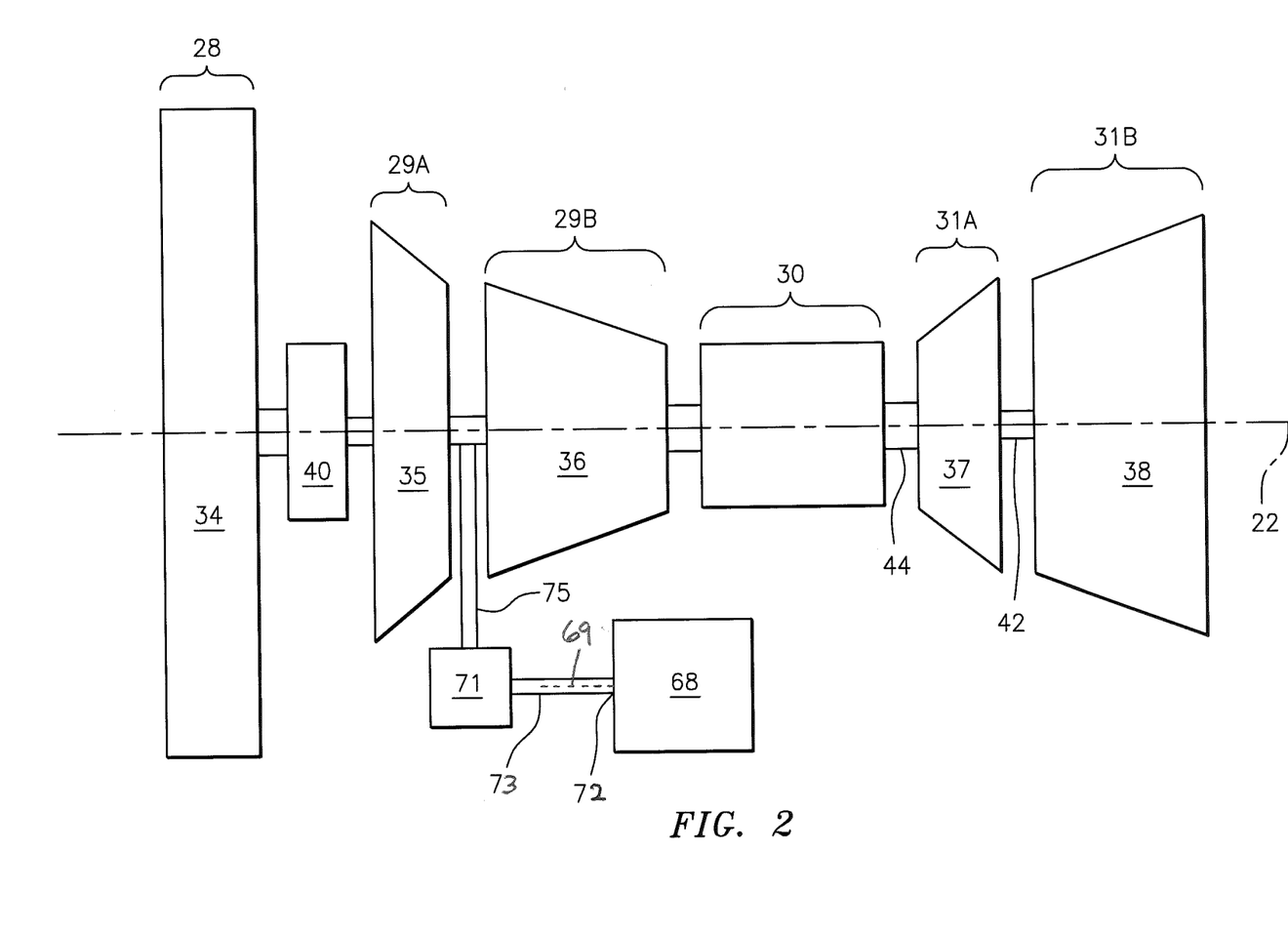
FIG. 2 is a schematic illustration of the engine of FIG. 1.

Referring to FIGS. 1 and 2, the engine 20 also includes a gearbox 68 (e.g., an accessory gearbox) that transmit mechanical power (e.g., torque) between the compressor section 29 and one or more engine accessories in order to drive those accessories, or in order to drive the HPC section 29B during startup. Examples of such an engine accessory may include a fuel pump, a scavenge pump, an electrical generator (e.g., an integrated drive generator), a hydraulic pump, an engine starter, one or more engine starter-generators, an alternator, etc. The present invention, however, is not limited to any particular engine accessory types or configurations.

Figure 3:
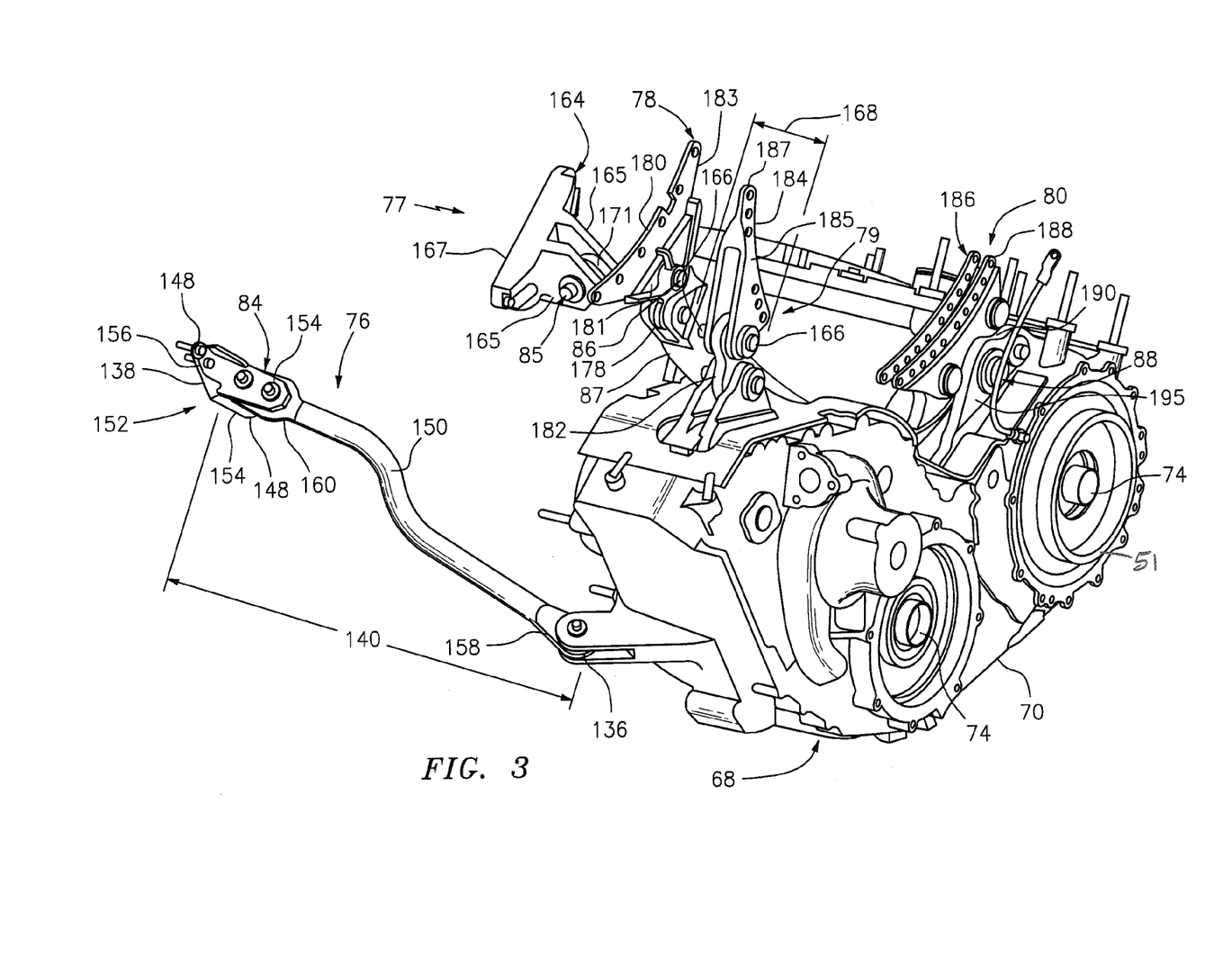
FIG. 3 is a perspective illustration of a gearbox assembly for the engine of FIG. 1.
Figure 4:
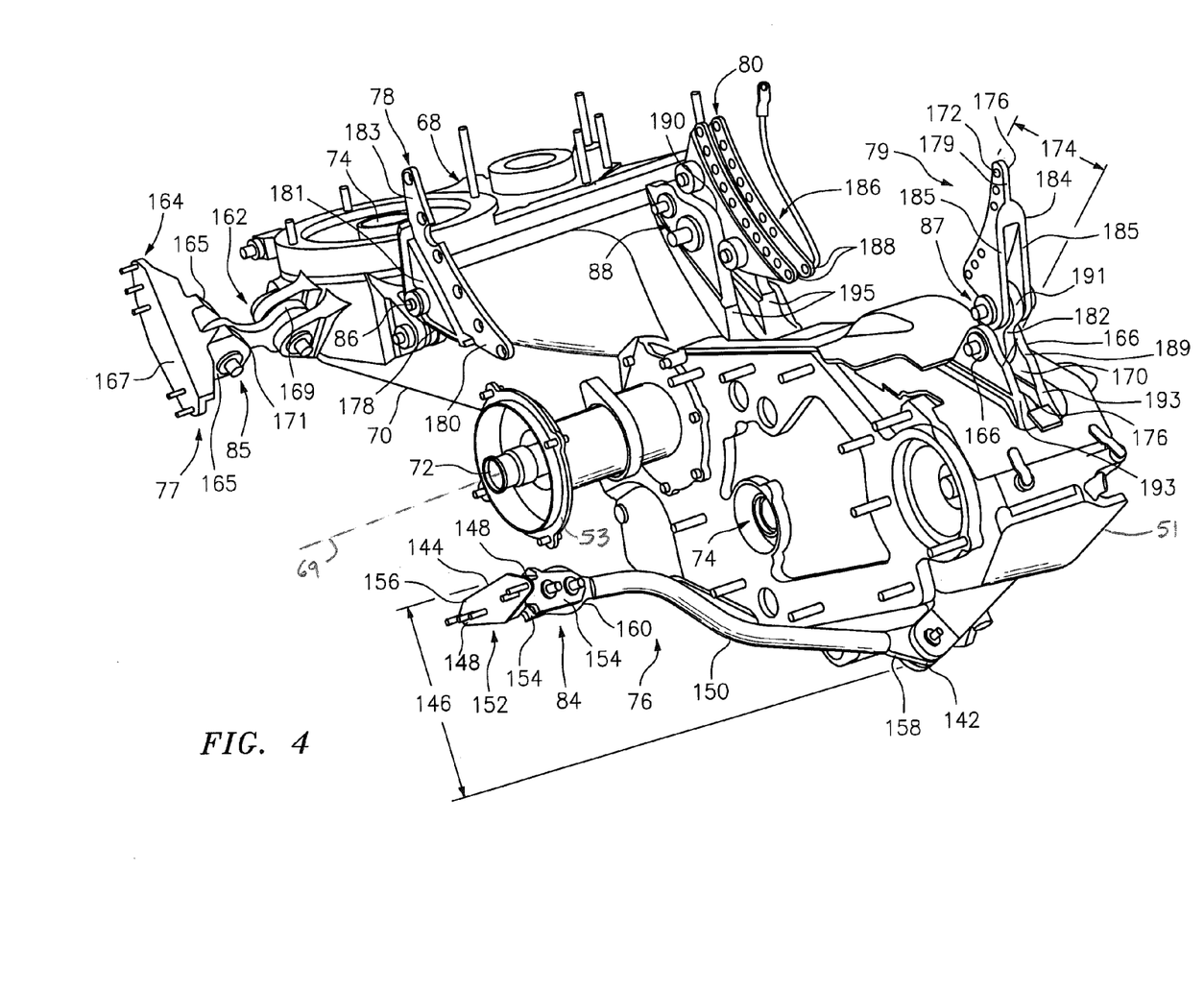
FIG. 4 is another perspective illustration of the gearbox assembly of FIG. 3.

Referring to FIGS. 3 and 4, the gearbox 68 includes various components housed within a gearbox case 70, which extends axially between a downstream end 51 and an upstream end 53. The gearbox components may include a power input 72 (e.g., a splined input shaft), one or more power outputs 74 (e.g., splined output shafts), and a drive train (not shown) that connects the power input 72 to the power outputs 74. The power input 72 is located at the upstream end 53. The power input 72 extends along an axis 69, which may be substantially parallel to the axis 22 (see FIG. 2). Referring again to FIG. 2, the power input 72 may be connected to an angle gearbox 71 through a layshaft 73. The angled gearbox 71 may be connected to the high speed shaft 44 or the HPC 36 through a towershaft 75.

Referring to FIGS. 1, 3 and 4, the gearbox 68 is connected to the engine housing 32 with a plurality of gearbox mounts 76-80. These gearbox mounts include one or more axial mounts 76 and 77 and/or one or more radial mounts 78-80. The present disclosure, however, is not limited to any particular number of axial or radial mounts or mount configurations. Each of the axial mounts 76 and 77 extends from the gearbox case 70 to the case 52 in a generally axial upstream direction relative to the axis 22 and/or the axis 69. Each of the axial mounts 76 and 77 may be connected to an annular flange 82 of the segment 58. Each of the radial mounts 78-80 extends from the gearbox case 70 to the case 52 in a direction that is substantially perpendicular to the axis 22 and/or the axis 69. The radial mount 78 may be connected to the bolted flanges 64 and 65. Each of the radial mounts 79 and 80 may be connected to the bolted flanges 66 and 67.

The gearbox mounts 76-80 and the gearbox 68 may be subject to relatively low thermally induced stresses during turbine engine operation. For example, whereas the segments 60-62 may be subject to a relatively high degree of thermal expansion, the segments 58 and 59 may be subject to a relatively low degree of thermal expansion. Dimensions between respective locations where the gearbox mounts 76-80 are connected to the case 52 therefore may remain substantially the same during engine operation. Thus, a tendency for the gearbox mounts 76-80 to be pulled away from one another by thermal expansion of the case 52 is diminished as compared to a gearbox that is connected to the case 50 downstream of the flange 67.

In addition to connecting the gearbox 68 to the engine housing 32, one or more of the gearbox mounts 76-80 may also prevent or reduce transmission of shock loads between the engine housing 32 and the gearbox 68. One or more of the gearbox mounts 76-80, for example, may each respectively include at least one fuse joint 84-88 as illustrated in FIGS. 3 and 4. These fuse joints 84-88 may substantially prevent movement between the gearbox 68 and the case 52 during a first operational and/or environmental state; e.g., during nominal flight conditions. The fuse joints 84-88, however, may also permit constrained movement between the gearbox 68 and the case 52 during a second operational and/or environmental state where the engine 20 is subject to a shock load; e.g., during non-nominal flight conditions where the engine is subject to heavy turbulence or a hard landing, the engine ingests a foreign object such as a bird, a rotor blade becomes unseated, etc.

The fuse joints may have similar configurations. Alternatively, some (or all) of the fuse joints may have different configurations. Each of the gearbox mounts 76-80, for example, may include a fuse joint with a configuration tailored to the particular loads that mount will be subject to during engine operation as well as space and/or weight constraints for that mount. Referring to the embodiment of FIGS. 3 and 4, for example, the fuse joints 84 and 88 may be configured as multi-point fuse joints to handle relatively large loads. The fuse joints 85-87 may be configured as concentric fuse joints to reduce the size and/or weight of the mounts.

Figure 5:
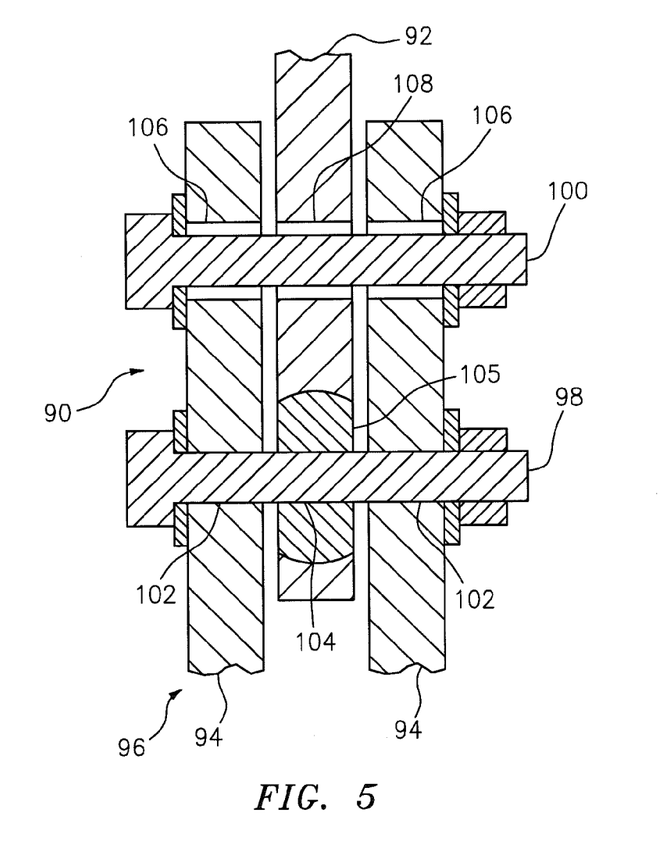
FIG. 5 is a sectional illustration of a fuse joint connecting a plurality of bodies during a first operational and/or environmental state.
Figure 6:
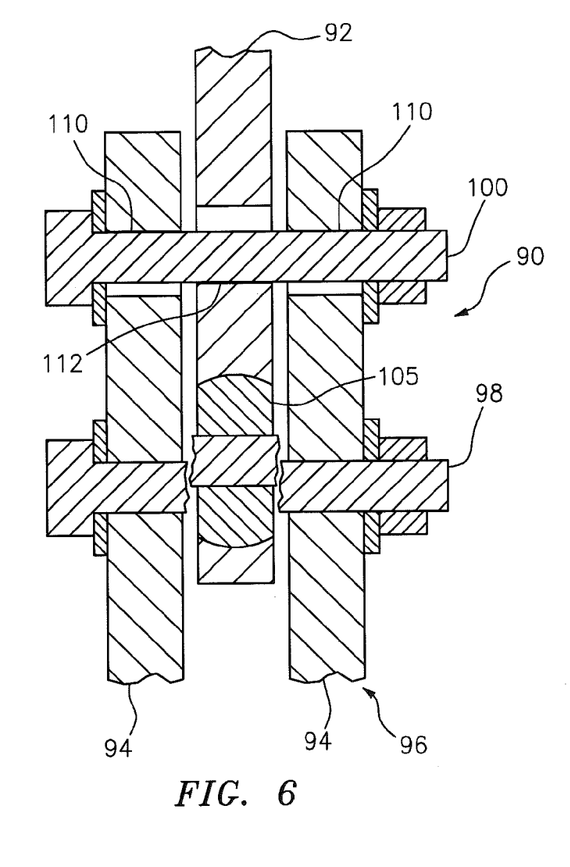
FIG. 6 is a sectional illustration of the fuse joint of FIG. 5 during a second operational and/or environmental state.

FIGS. 5 and 6 are sectional illustrations of a multi-point fuse joint 90 that connects a first body 92 (e.g., a strut) to flanges 94 of a second body 96 (e.g., a flanged bracket). The fuse joint 90 includes a fuse fastener 98 (e.g., a shear bolt or pin) and a catcher fastener 100 (e.g., a standard bolt or pin). The fuse fastener 98 is adapted to deform (e.g., bend or crush) and/or fracture (e.g., crack or break) when it is subject to a shear load over a first fuse threshold. In contrast, the catcher fastener 100 is adapted to withstand a shear load that is, for example, between about two and about four times greater than the first fuse threshold. The fuse fastener 98 extends through respective apertures 102 and 104 in the flanges 94 and the first body 92. The aperture 104 may be defined by a spherical bearing 105 that is configured with the first body 92. Alternatively, the aperture 104 may be defined by the first body 96 and the spherical bearing 105 may be omitted. A diameter of the fuse fastener 98 is substantially equal to diameters of the respective apertures 102 and 104. The catcher fastener 100 extends through respective apertures 106 and 108 in the flanges 94 and the first body 92. A diameter of the catcher fastener 100 is less than a diameter of the respective apertures 106. The diameter of the catcher fastener 100 is also or alternatively less than a diameter of the aperture 108.

During the first operational and/or environmental state, the fuse joint 90 may be subject to a shear load that is less than the first fuse threshold. The fuse fastener 98 therefore may substantially prevent movement between the first and the second bodies 92 and 96 as illustrated in FIG. 5 as well as transfer a load between the bodies. The catcher fastener 100 may be substantially unloaded. In contrast, during the second operational and/or environmental state, the fuse joint 90 may be subject to a shear load that is equal to or greater than the first fuse threshold. The fuse fastener 98 therefore may break as illustrated in FIG. 6, thereby allowing the first body 92 to move relative to the second body 96. This movement, however, is constrained (e.g., limited) by the catcher fastener 100 engaging (e.g., contacting) respective surfaces 110 and 112 of the first and the second bodies 92 and 96. The catcher fastener 100 therefore transfers the load between the first and the second bodies 92 and 96.

Figure 7:
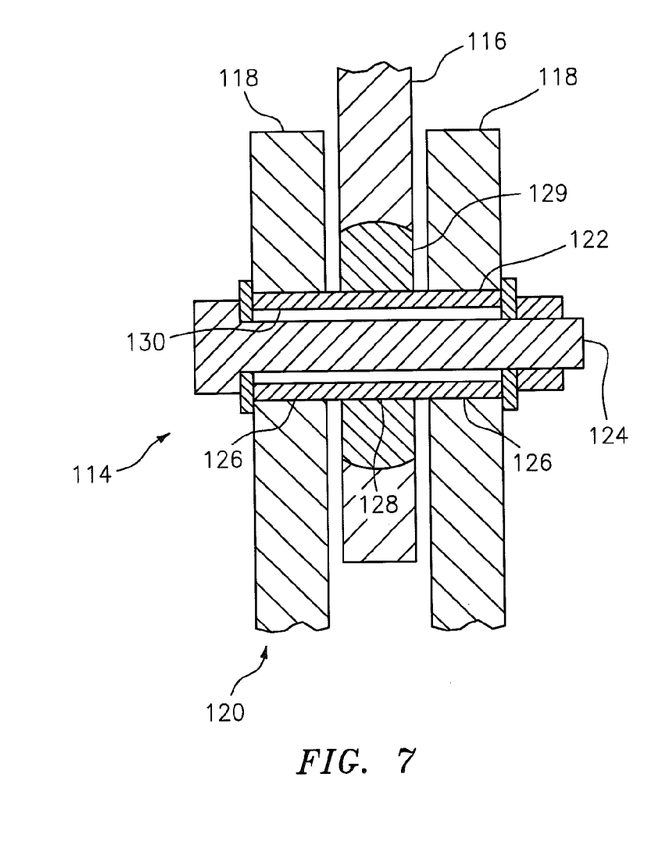
FIG. 7 is a sectional illustration of an alternate embodiment fuse joint connecting a plurality of bodies during a first operational and/or environmental state.
Figure 8:
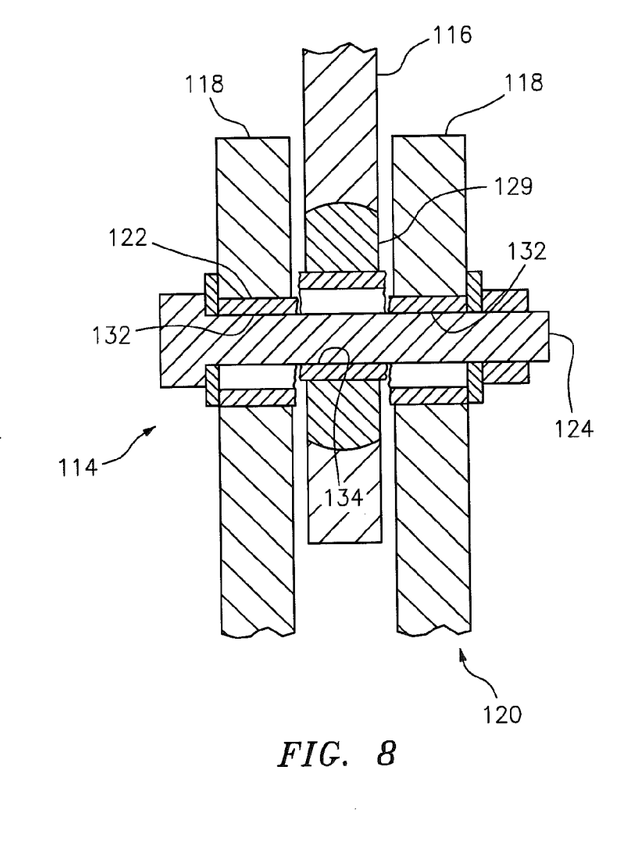
FIG. 8 is a sectional illustration of the fuse joint of FIG. 7 during a second operational and/or environmental state.

FIGS. 7 and 8 are sectional illustrations of a concentric fuse joint 114 that connects a first body 116 to flanges 118 of a second body 120. The fuse joint 114 includes a fuse fastener 122 (e.g., a shear sleeve) and a catcher fastener 124 (e.g., a standard bolt or pin). The fuse fastener 122 is adapted to deform and/or fracture when it is subject to a shear load over a second fuse threshold. This second fuse threshold may be substantially equal to or different (e.g., less) than the first fuse threshold. In contrast, the catcher fastener 124 is adapted to withstand a shear load that is, for example, between about two and about four times greater than the fuse threshold. The fuse fastener 122 extends through respective apertures 126 and 128 in the flanges 118 and the first body 116. The aperture 128 may be defined by a spherical bearing 129 that is configured with the first body 116. Alternatively, the aperture 128 may be defined by the first body 116 and the spherical bearing 129 may be omitted. An outer diameter of the fuse fastener 122 is substantially equal to diameters of the respective apertures 126 and 128. The catcher fastener 124 extends through a bore of the fuse fastener 122. A diameter of the catcher fastener 124 is less than an inner diameter of the fuse fastener 122. The catcher fastener 124 therefore is separated from an inner surface 130 of the fuse fastener 122 by a gap with, for example, an annular or crescent cross-sectional geometry.

During the first operational and/or environmental state, the fuse joint 114 may be subject to a shear load that is less than the second fuse threshold. The fuse fastener 122 therefore may substantially prevent movement between the first and the second bodies 116 and 120 as illustrated in FIG. 7 as well as transfer a load between the bodies. The catcher fastener 124 may be substantially unloaded. In contrast, during the second operational and/or environmental state, the fuse joint 114 may be subject to a shear load that is equal to or greater than the second fuse threshold. The fuse fastener 122 therefore may break as illustrated in FIG. 8, thereby allowing the first body 116 to move relative to the second body 120. This movement, however, is constrained by the catcher fastener 124 engaging respective surfaces 132 and 134 of the first and the second bodies 116 and 120 through fragmented portions of the fuse fastener 122. The catcher fastener 124 therefore transfers the load between the first and the second bodies 116 and 120.

Referring now to the embodiment of FIGS. 1, 3 and 4, each of the axial mounts (e.g., the mount 76) extends axially in an upstream direction from a downstream end 136 to an upstream end 138, which defines an axial length 140. Each of the axial mounts (e.g., the mount 76) extends radially in an inward direction from a radial outer side 142 to a radial inner side 144, which defines a radial height 146. This radial height 146 is less than the axial length 140. In alternative embodiments, however, the radial height 146 may be substantially equal to or greater than the axial length 140. Each of the axial mounts (e.g., the mount 76) extends laterally (e.g., circumferentially or tangentially) between opposing sides 148.

The axial mount 76 includes the fuse joint 84 and one or more linkages 150 and 152. The fuse joint 84 is configured as a multi-point fuse joint. The linkages include a strut 150, and a bracket 152 with a pair of flanges 154 extending out from a base 156. The strut 150 extends substantially in an axial upstream direction from a downstream end portion 158 to an upstream end portion 160. One or both of these end portions 158 and 160 may be configured as a flat tongue. The downstream end portion 158 is arranged between and connected to flanges on the gearbox case 70. The upstream end portion 160 is arranged between and connected to the flanges 154 with the fuse joint 84. The bracket 152 extends substantially in an axial upstream direction from the strut 150 to the case 52. The base 156 is connected to the flange 82 with one or more fasteners (e.g., bolts), which connects the bracket 152 and the strut 150 to the case 52. Alternatively, the upstream end portion 160 may be connected to lugs that are integral with the case 52 (not shown).

The axial mount 77 includes the fuse joint 85 and one or more linkages 162 and 164. The fuse joint 85 is configured as a concentric fuse joint. The linkages include a strut 162, and a bracket 164 with a pair of flanges 165 extending out from a base 167. The strut 162 extends substantially in an axial upstream direction from a downstream end portion 169 to an upstream end portion 171. One or both of these end portions 169 and 171 may each be configured as a rod end with a spherical bearing 129 (see FIG. 6); e.g., a Heim joint. The downstream end portion 169 is arranged between and connected to flanges on the gearbox case 70. The upstream end portion 171 is arranged between and connected to the flanges 165 with the fuse joint 85. The bracket 164 extends substantially in an axial upstream direction from the strut 162 to the case 52. The base 167 is connected to the flange 82 with a plurality of fasteners, which connects the bracket 164 and the strut 162 to the case 52. Alternatively, the upstream end portion 171 may be connected to lugs that are integral with the case 52 (not shown).

Each of the radial mounts (e.g., the mount 87) extends axially between opposing ends 166, which defines an axial length 168. Each of the radial mounts (e.g., the mount 87) extends radially in an inward direction from a radial outer side 170 to a radial inner side 172, which defines a radial height 174. This radial height 174 is greater than the axial length 168. In alternative embodiments, however, the radial height 174 may be substantially equal to or less than the axial length 168. Each of the radial mounts (e.g., the mount 87) extends laterally between opposing sides 176.

The radial mount 78 includes the fuse joint 86 and one or more linkages 178 and 180. The fuse joint 86 is configured as a concentric fuse joint. The linkages include a strut 178, and a bracket 180 with a pair of flanges 181 extending out from a base 183. The strut 178 extends substantially in a radial inward direction from an outer end portion to an inner end portion. One or both of these end portions may be configured as a rod end with a spherical bearing. The outer end portion is arranged between and connected to flanges on the gearbox case 70. The inner end portion is arranged between and connected to the flanges 181 with the fuse joint 86. The bracket 180 extends substantially in a radial inward direction from the strut 178 to the case 52. The base 183 is connected to the bolted flanges 64 and 65 with a plurality of fasteners, which connects the bracket 180 and the strut 178 to the case 52.

The radial mount 79 includes the fuse joint 87 and one or more linkages 182 and 184. The fuse joint 87 is configured as a concentric fuse joint. The linkages include a strut 182, and a bracket 184 with a pair of flanges 185 extending out from a base 187. The strut 182 extends in a lateral direction from a first end portion 189 to a second end portion 191. One or both of these end portions 189 and 191 may be configured as a rod end with a spherical bearing. The first end portion 189 is arranged between and connected to flanges 193 on the gearbox case 70. The second end portion 191 is arranged between and connected to the flanges 185 with the fuse joint 87. The bracket 184 extends substantially in a radial inward direction from the strut 182 to the case 52. The base 187 is connected to the bolted flanges 66 and 67 with a plurality of fasteners, which connects the bracket 184 and the strut 182 to the case 52.

The radial mount 80 includes the fuse joint 88 and a linkage 186. The fuse joint 88 is configured as a multi-point fuse joint. The linkage is configured as a bracket 186 with a pair of flanges 188 extending out from a base 190. The base 190 is arranged between and connected to flanges 195 on the gearbox case 70 with the fuse joint 88. The bracket 186 extends substantially in a radial inward direction from the gearbox case 70 to the case 52. The flanges 188 are connected to the bolted flanges 66 and 67, which connects the bracket 186 to the case 52. In this configuration, the fuse joint 88 is substantially axially aligned with the fuse joint 87.

Figure 9:
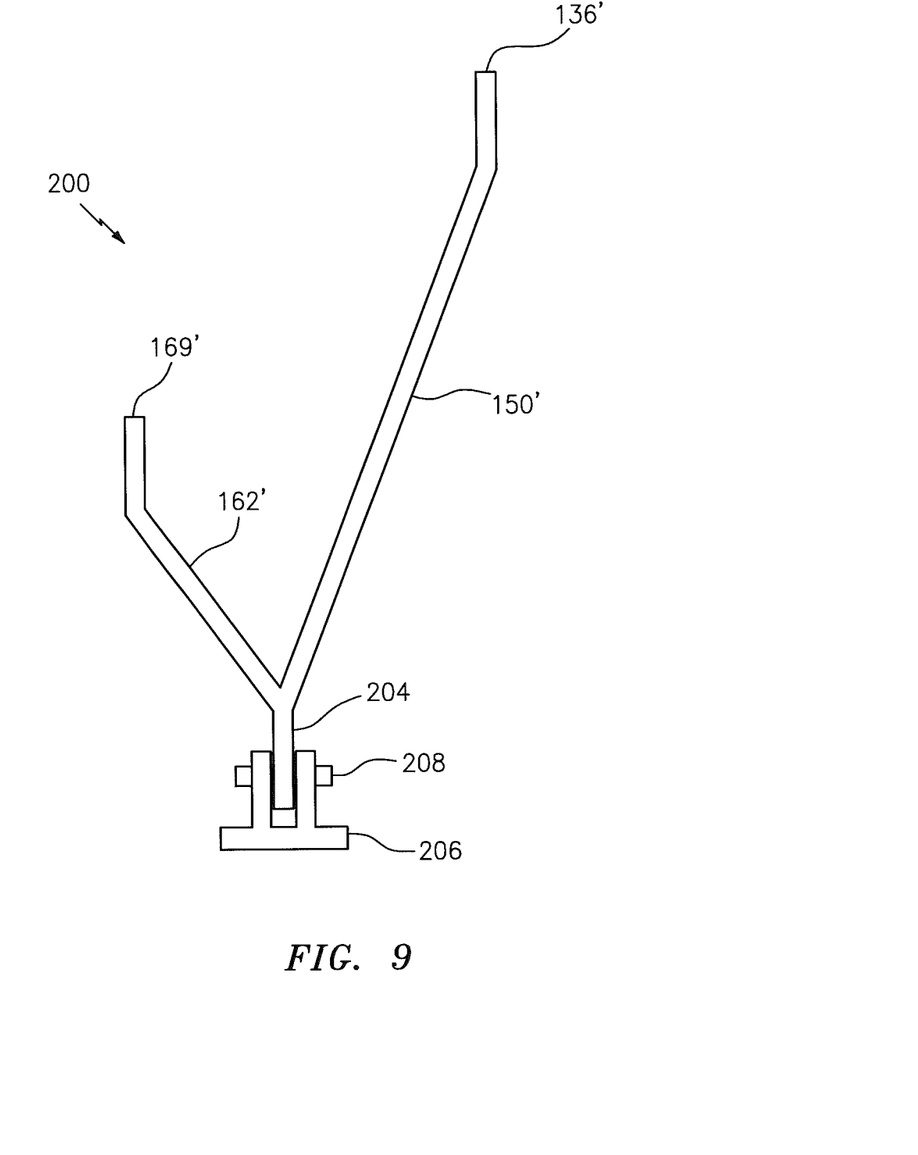
FIG. 9 is an illustration of an axial mount with a y-strut.

FIG. 9 is an illustration of an alternate embodiment axial mount 200, which may replace the axial mounts 76 and 77 illustrated in FIGS. 2 and 3. The axial mount 200 includes a y-strut 202 having a pair of arms 150' and 162' that converge axially in the upstream direction from respective downstream ends 136' and 169' to a base 204. The downstream ends 136' and 169' may be respectively connected to flanges on the gearbox case 70 (see FIGS. 2 and 3). The base 204 may be connected to a bracket 206 with a fuse joint 208. The fuse joint 208 may be configured as a concentric fuse joint as illustrated in FIG. 9, or alternatively as a multi-point fuse joint or any other type of fuse joint. The bracket 206 may be connected to the flange 82 (see FIG. 1) with one or more fasteners, which connects the bracket 206 and the y-strut 202 to the case 52.

Referring again to FIG. 1, the turbine engine 20 is disclosed herein as a two-spool turbofan that generally incorporates the fan section 28, the compressor section 29, the combustor section 30 and the turbine section 31. Alternative engines might include an augmentor section (not shown) among other systems or features. The fan section 28 drives air along the bypass gas path 48 while the compressor section 29 drives air along the core gas path 46 for compression and communication into the combustor section 30 then expansion through the turbine section 31. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 230 and a high spool 232 mounted for rotation about an engine central longitudinal axis 22 relative to an engine static structure (e.g., the engine case 52) via several bearing structures 238. The low spool 230 generally includes the inner shaft 42 that interconnects the fan rotor 34, the low pressure compressor rotor 35 and the low pressure turbine rotor 38. The inner shaft 42 drives the fan rotor 34 directly or through the geared architecture (e.g., gear train 40) to drive the fan rotor 34 at a lower speed than the low spool 230. An exemplary reduction transmission is an epicyclic transmission, namely a planetary or star gear system.

The high spool 232 includes the outer shaft 44 that interconnects the high pressure compressor rotor 36 and the high pressure turbine rotor 37. A combustor 256 is arranged between the high pressure compressor rotor 36 and the high pressure turbine rotor 37. The inner shaft 42 and the outer shaft 44 are concentric and rotate about the engine central longitudinal axis 22 which is collinear with their longitudinal axes.

Core airflow is compressed by the low pressure compressor rotor 35 then the high pressure compressor rotor 36, mixed with the fuel and burned in the combustor 256, then expanded over the high pressure turbine rotor 37 and the low pressure turbine rotor 38. The turbine rotors 38 and 37 rotationally drive the respective low spool 230 and high spool 232 in response to the expansion.

The main engine shafts 42 and 44 are supported at a plurality of points by the bearing structures 238 within the static structure. It should be understood that various bearing structures 238 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture can include the epicyclic gear train 40, such as a planetary gear system or other gear system. The example epicyclic gear train has a gear reduction ratio of greater than about 2.3, and in another example is greater than about 2.5:1. The geared turbofan enables operation of the low spool 230 at higher speeds which can increase the operational efficiency of the low pressure compressor section 29A and the low pressure turbine section 31B and render increased pressure in a fewer number of stages.

A pressure ratio associated with the low pressure turbine section 31B is pressure measured prior to the inlet of the low pressure turbine section 31B as related to the pressure at the outlet of the low pressure turbine section 31B prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor rotor 35, and the low pressure turbine section 31B has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 28 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 28 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/518.7" in which "T" represents the ambient temperature in degrees Rankine. The Low Corrected Fan Tip Speed according to one non-limiting embodiment of the example gas turbine engine 20 is less than about 1150 fps (351 m/s).

The present disclosure is not limited to the above noted embodiments. For example, "upstream", "downstream", "inner" and "outer" nomenclature is used to orientate the components of the described gearbox mounts, but these components may be utilized in other orientations. The axial mounts, for example, may be configured to extend in an axial downstream direction. In addition, the fuse joints and/or the linkages may have configurations other than those described. The struts may be connected to the gearbox with an additional fuse joint, or the fuse joint connecting the strut to the bracket may be omitted.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine assembly, comprising:
    a turbine engine case extending along an axis between an upstream end and a downstream end, the turbine engine case including a plurality of discrete axial segments including a first segment and a second segment that is downstream of the first segment;
    a gearbox; and
    a plurality of gearbox mounts connecting the gearbox to the turbine engine case, and comprising an axial mount that extends axially, relative to the axis, in an upstream direction from the gearbox to the first segment of the turbine engine case;
    wherein the plurality of gearbox mounts further include a radial mount that extends radially towards the axis, in a direction substantially perpendicular to the axis from the gearbox to the second segment of the turbine engine case.

2. The engine assembly of claim 1, wherein the axial mount has a radial height and an axial length that is greater than the radial height.

3. The engine assembly of claim 1, further comprising:
a pair of flanges connected to the turbine engine case;
wherein the axial mount includes a linkage extending axially between a downstream end portion and an upstream end portion that is arranged between and connected to the pair of flanges.

4. The engine assembly of claim 3, wherein the upstream end portion includes a bearing that is connected to the pair of flanges.

5. The engine assembly of claim 1, wherein the axial segments further include a third segment arranged axially between the first segment and the second segment.

6. The engine assembly of claim 5, wherein a third of the plurality of gearbox mounts connects the gearbox to the third segment.

7. The engine assembly of claim 1, wherein the plurality of gearbox mounts further include a second axial mount that extends axially in the upstream direction from the gearbox to the turbine engine case.

8. The engine assembly of claim 1, wherein
the axial mount includes a linkage and a fuse joint that connects the linkage to the turbine engine case; and
the fuse joint is configured to substantially prevent movement between the linkage and the turbine engine case when the fuse joint is subject to loading less than a threshold, and to permit constrained movement between the linkage and the turbine engine case when the loading is greater than the threshold.

9. The engine assembly of claim 8, wherein
the linkage includes a plurality of apertures; and
the fuse joint includes a plurality of fasteners that connect the linkage to the turbine engine case and that respectively extend into the plurality of apertures.

10. The engine assembly of claim 8, wherein
the linkage includes an aperture;
the fuse joint includes a sleeve that extend into the aperture, and a fastener that extends into the sleeve; and
the sleeve and the fastener connect the linkage to the turbine engine case.

11. The engine assembly of claim 1, further comprising:
a bracket connected to the turbine engine case, and including a first aperture and a second aperture;
wherein the axial mount includes
a linkage including a third aperture and a fourth aperture;
a first fastener extending into the first aperture and the third aperture, and having a diameter that is substantially equal to respective diameters of the first aperture and the third aperture; and
a second fastener extending into the second aperture and the fourth aperture, and having a diameter that is less than at least one of a diameter of the second aperture and a diameter of the fourth aperture.

12. The engine assembly of claim 1, wherein the axial mount includes:
a linkage including an aperture;
a sleeve extending into the aperture; and
a fastener extending into the sleeve, and separated from the sleeve by a gap.

13. The engine assembly of claim 1, wherein the axial mount includes:
a base connected to the turbine engine case; and
a plurality of arms connected to the gearbox, wherein the arms converge to the base.

14. A turbine engine assembly, comprising:
a turbine engine case extending along an axis between an upstream end and a downstream end;
a gearbox; and
a plurality of gearbox mounts connecting the gearbox to the turbine engine case, and including a strut that extends axially between an upstream portion connected to the turbine engine case and a downstream portion connected to the gearbox;
wherein the plurality of gearbox mounts further include a second mount and a third mount;
wherein the second mount extends radially towards the axis of the turbine engine case, from the gearbox to the turbine engine case and mounts the gearbox to the turbine engine case independent of the third mount; and
wherein the third mount extends radially, relative to the axis of the turbine engine case, from the gearbox to the turbine engine case and mounts the gearbox to the turbine engine case independent of the second mount.

15. The engine assembly of claim 14, wherein the plurality of gearbox mounts further include a fuse joint that connects the upstream portion to the turbine engine case.

16. The engine assembly of claim 14, wherein the strut is included in an axial mount having a radial height and an axial length that is greater than the radial height.

17. A turbine engine assembly, comprising:
a turbine engine case extending along an engine axis;
a gearbox comprising:
a gearbox case extending between a downstream end and an upstream end; and
a power input extending along power input axis which is generally parallel with the engine axis, and located at the upstream end; and
a plurality of gearbox mounts connected to the gearbox case, and comprising an axial mount that extends axially relative to the engine axis, in an upstream direction from the gearbox case to a first portion of the turbine engine case;
wherein the plurality of gearbox mounts further include a radial mount that extends radially towards the engine axis, from the gearbox to a second portion the turbine engine case that is axially, relative to the engine axis, aft of the first portion of the turbine engine case; and
wherein the gearbox is configured such that a plurality of engine accessories may be mounted to and driven by the gearbox.

18. The engine assembly of claim 17, wherein the axial mount comprises:
a first linkage;
a second linkage; and
a fuse joint configured to substantially prevent movement between the first linkage and the second linkage when the fuse joint is subject to loading less than a threshold, and to permit a constrained movement between the first linkage and the second linkage when the loading is greater than the threshold.

* * * * *